Sept. 17, 1935.  C. H. MARTIN  2,014,479
LAND LEVELER
Filed May 20, 1931   4 Sheets-Sheet 1
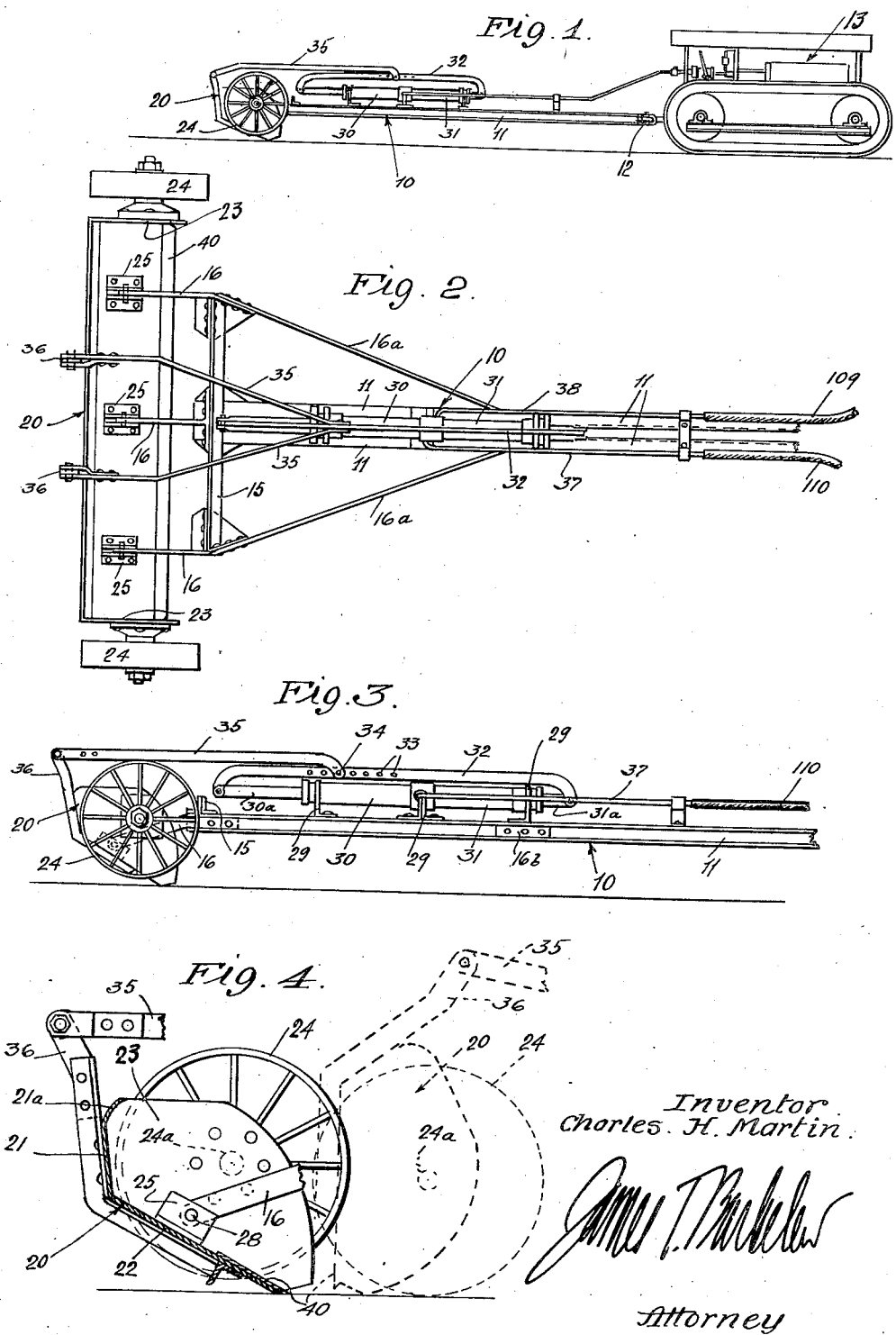

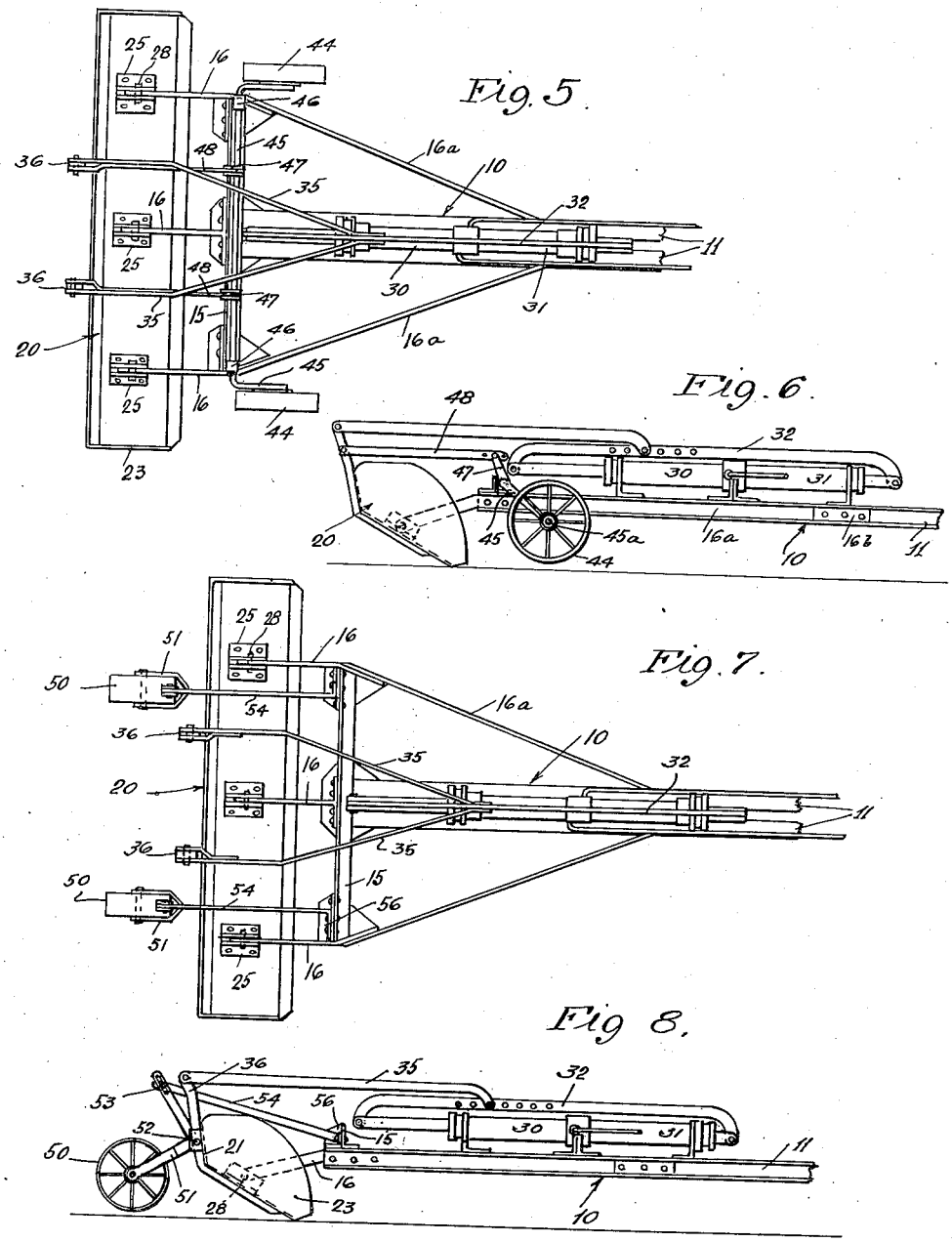

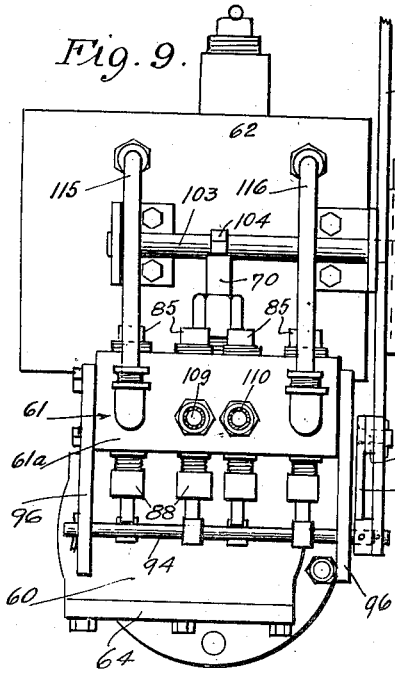
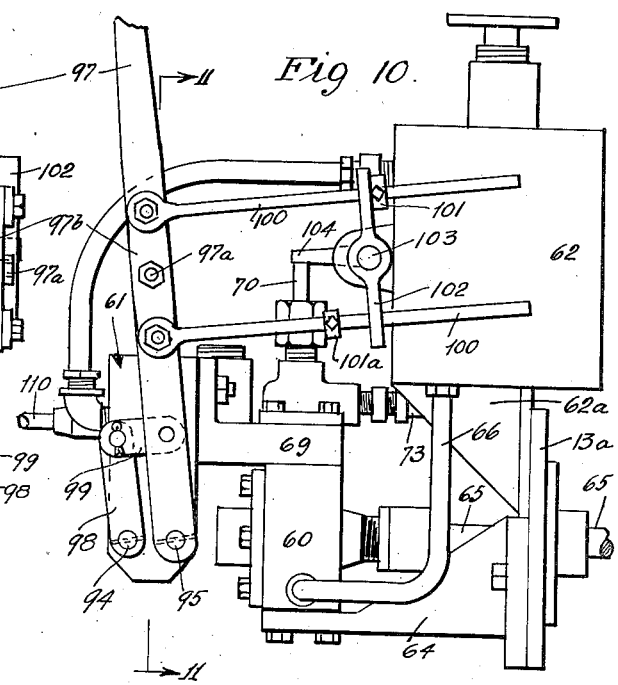
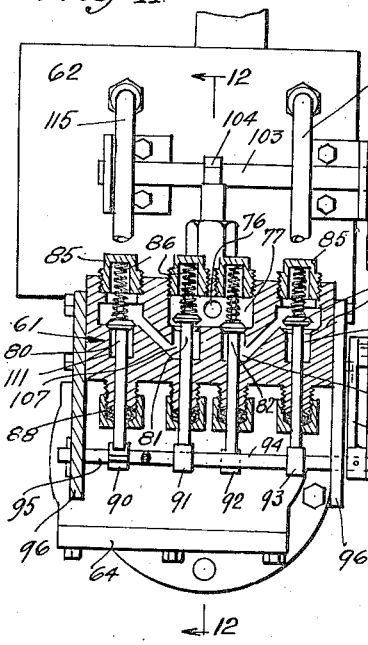
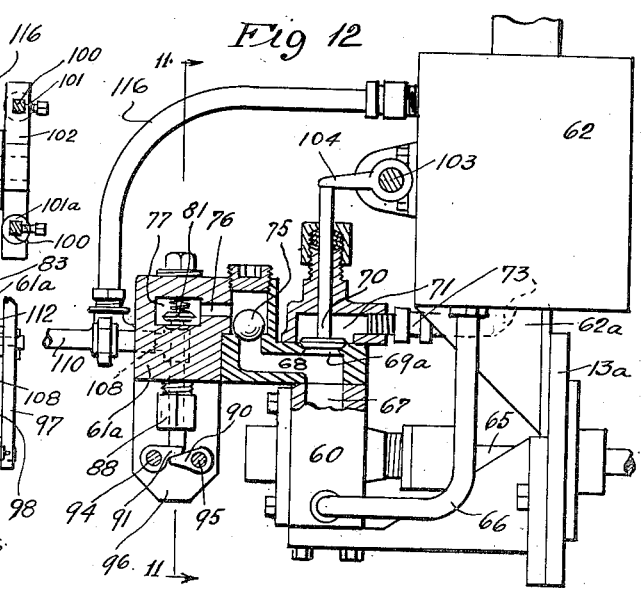

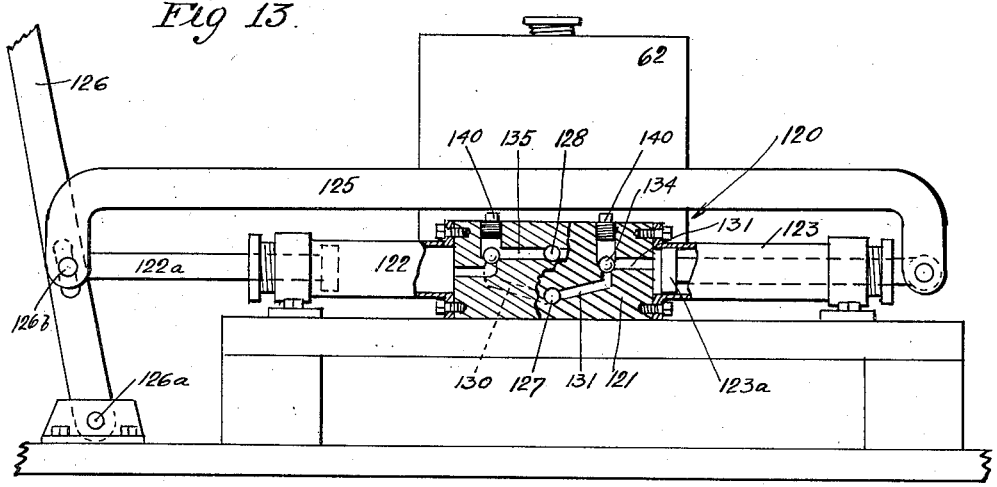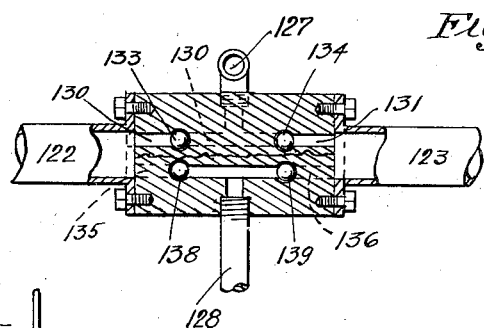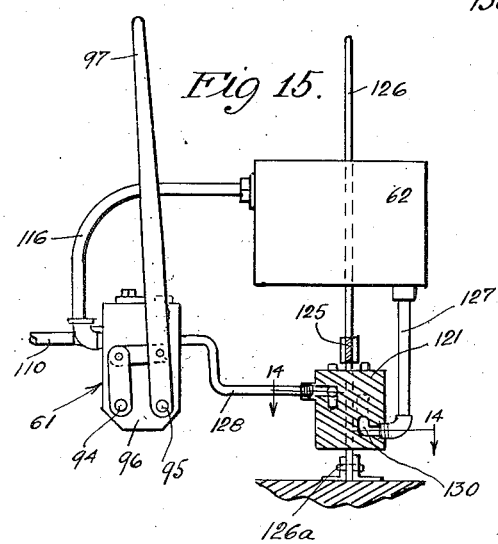

Patented Sept. 17, 1935

2,014,479

UNITED STATES PATENT OFFICE 2,014,479

LAND LEVELER

Charles H. Martin, Los Angeles, Calif.

Application May 20, 1931, Serial No. 538,648

14 Claims. (Cl. 37—169)

This invention relates generally to earth moving and distributing implements, and deals in the majority of its aspects with land levelers for use in scraping and distributing soil in field cultivation, road construction, and like purposes.

Land leveling devices of the present type may be characterized as comprising the horizontally extending scraper, so shaped as to scrape the soil, and so mounted on wheels as to be capable of tilting movement into and out of scraping engagement with the soil. Heretofore the customary manner of mounting the scraper for such tilting movement, has been to support it on wheels so arranged as to carry the scraper in all its scraping positions. That is to say, in the usual type of land leveler, the wheels ride on the ground not only when the scraper is out of engagement with the ground, but when it is in scraping positions as well.

One object of the invention is to provide an improved form of land leveler wherein the scraper, when in scraping positions, rests directly on the ground and is unsupported by the wheels, the mounting of the latter being such that in these positions of the scraper, the wheels are raised off the ground and the weight of the leveler is carried entirely by the scraper. To counteract the tendency for the scraper to penetrate the soil beyond desired depths, due to the load imposed by the weight of the scraper itself and that of the frame parts connected therewith, I provide means whereby a balancing or lifting effect is had on the scraper, such as will prevent its becoming overloaded and assure even penetration.

The invention also includes a mechanism for operating the scraper in its tilting movement; and this particular form of scraper operating mechanism may be characterized as a fluid pressure actuated type, designed particularly with the view of assuring ease and accuracy in the operation and control of the scraper. My preferred form of operating mechanism comprises a pair of cylinders mounted in tandem arrangement on the leveler frame, and containing a pair of interconnected fluid pressure operated plungers operatively connected to the scraper, the latter being tiltable in opposite directions by the selective delivery of operating fluid to the cylinders from a suitable fluid pump. In connection with the scraper operating mechanism I provide means whereby the scraper may be locked against tilting movement in any position of adjustment, this means being preferably so incorporated in the operating mechanism as to constitute a fluid or hydraulic lock.

The scraper operating mechanism also includes a novel form of fluid control valve mechanism for regulating the delivery of operating fluid from the pump to the cylinders and the fluid exhaust therefrom, the valve being so designed as to be especially advantageous in implements of the present and like types, by virtue of its simple and economical construction, as well as its dependable operation. A particular feature of my improved control valve mechanism is the provision of the safety or relief valve whereby the leveling up of excessive pressures within the pump and valve mechanism automatically closes the delivery valves and opens the relief valve to protect the mechanism against damage.

Having set forth certain general objects and features of the invention, I shall now proceed to a detailed description of typical and illustrative forms, from which description the above mentioned and additional objects and features of the invention will be more fully understood. Reference is had for purposes of description to the accompanying drawings, in which:—

Fig. 1 is a side elevation of a land leveler constructed according to my invention, shown connected to a tractor;

Fig. 2 is an enlarged plan view of the leveler of Fig. 1;

Fig. 3 is a side elevation of Fig. 2;

Fig. 4 is an enlarged fragmentary vertical section through the scraper, two working positions of the scraper being shown;

Fig. 5 is a plan view of a leveler having a variational form of wheel mounting;

Fig. 6 is a side elevation of Fig. 5;

Fig. 7 is a plan view of a leveler having another variational form of wheel mounting;

Fig. 8 is a side elevation of Fig. 7;

Fig. 9 is an end elevation showing a preferred form of leveler control valve;

Fig. 10 is a side elevation of the control valve and operating fluid pump as viewed from the right of Fig. 9;

Fig. 11 is a section on lines 11—11 of Figs. 10 and 12;

Fig. 12 is a view similar to Fig. 10 with parts of the valve mechanism shown in vertical section in the plane of lines 12—12 in Fig. 11;

Fig. 13 is a side elevation illustrating a variational form of pump mechanism, the valve block being shown in section;

Fig. 14 is a fragmentary sectional plan on line 14—14 of Fig. 15; and

Fig. 15 is a side elevation, similar to Fig. 10, showing the connection of the hand pump with the main control valve parts, the pump valve block being shown in vertical median section.

In a preferred form of my leveler, as shown in Figs. 1 to 4, the draft frame, generally indicated at 10, includes a pair of spaced main draft members 11 which are provided at their forward ends with eyebolt 12 for attachment to the tractor 13 or other draft means. Fastened at the rear ends of draft members 11, is the cross bar 15 carrying rearwardly extending arms 16 to which the scraper proper is attached. The end pair of arms 16 continue forwardly of bar 15 at 16a and converge to points of attachment at 16b with members 11; the frame assembly consisting of members 11, 15 and 16a thus forming a triangular truss through which the load on arms 16 is equalized.

The scraper 20, connected to the frame through arms 16, comprises a back portion 21, a slanting bottom portion 22, and end plates 23 to which are secured carrying wheels 24. Bifurcated brackets 25 are fastened to the scraper bottom 22 and receive arms 16. Pins 28, (Fig. 4) passing through the brackets and arms 16, provide pivotal connections about which the scraper may be swung vertically, relative to the frame.

This type of draft frame provides for pulling the scraper by direct connection instead of through the wheel axles as is usual. This is a stronger construction and allows the use of a much longer scraper for the plurality of arms 16 hold the scraper rigidly against bending; and in case the scraper strikes some hidden obstacle, the arms 16 strengthen the scraper sufficiently to prevent damage by distortion.

While in its broad aspects, the invention contemplates the provision of any suitable means for operating the scraper on its pivotal mounting, I preferably utilize a fluid pressure actuated mechanism for this purpose, primarily for the reason that by the use of an operating mechanism of this character the movement of the scraper is most accurately and easily controlled. The scraper actuating means includes a pair of tandem cylinders 30 and 31 mounted on the draft frame by brackets 29 and provided with pistons which are interconnected at the ends of the piston rods 30a, 31a by means of connecting link 32. Link 32 is provided with a series of holes 33 to permit the adjustable attachment by pin 34 of a pair of arms 35 which are pivotally fastened at their other ends to fixed extension arms 36 on the scraper back 21. Pipes 37 and 38 leading into the adjacent ends of cylinders 30 and 31, respectively, conduct the pressure operating fluid to the cylinders to actuate the pistons therein.

When pressure is applied to line 37, cylinder 30 is filled and the piston therein is forced outward and rearward as shown in Figs. 2 and 3. This movement is transmitted to the piston in cylinder 31 by connecting link 32, and the fluid therein is forced out through pipe 38. As a result of the movement of link 32 rearwardly of the frame, the scraper is tilted backward to the position of Figs. 3 and 4 with wheels 24 off the ground and the forward edge of the scraper cutting blade 40, attached to bottom 22, on the ground in a cutting or scraping position. When it is desired to raise blade 40 from cutting position and to tilt the scraper to dumping position, pressure is released from pipe 37 and applied to pipe 38 so that cylinder 30 can be emptied and cylinder 31 filled, thus forcing the pistons and link 32 to the right (Fig. 3) and rotating scraper 20 about pins 28 and its point of engagement with the ground.

The normal operative position of the scraper when stripping the soil is with the weight of the scraper and frame on blade 40 and the scraper tilted backward to the full line position of Fig. 4. The scraper bottom 22 is thus inclined forwardly and downwardly at a considerable angle while the back 21 is approximately vertical.

The forward draft on the scraper is applied through arms 16 in a substantially horizontal direction. The initial load on the scraper results from the penetration of the blade 40 into the ground and is generally normal to the blade surface. As the scraper fills, the weight of the soil adds to the initial loading and is normal to the scraper surface at all points. The result is a tendency for the blade to follow the line of least resistance and to penetrate directly into the soil in the same direction that it is inclined. To counteract this tendency, the top of the scraper back is curved as at 21a so that the pressure of the dirt against this curved surface is upward and opposes the downward load on the blade edge. The reaction against curved surface 21a is substantially parallel to the bottom 22.

The result of this construction is that the blade at first digs into the soil because of the scraper weight and the soil pressure; but once the scraper is loaded, the pressure against the curve 21a is sufficient to prevent too deep penetration of the blade as a result of the load of soil. Consequently, the scraper pulls smoothly and evenly, and always takes a uniformly maximum load, the amount of which may be varied by varying the angle of the scraper and hence, of blade 40. Once loaded, the soil pressures are so balanced that the scraper is lifted until blade 40 is at the ground surface and does not continue to pile up a load on itself so that the tractor eventually stalls, but the full load is pushed ahead by the scraper and curve 21a keeps the soil from rolling over the scraper back. This balancing action is especially true where the comparatively smooth surface is being leveled by stripping, but is also true where piles of dirt are being picked up and moved.

Another advantage derived from the shape of the scraper is that it is easy to tilt the scraper forward to dump the load. The inclination of the bottom and the curving of the back so distribute the soil pressures that the scraper is balanced by the load. When the scraper is pulled by a small tractor unable to haul the filled scraper, it is possible to dump the load and go on. Indeed, my fluid pressure operating means makes it possible to dump the scraper without forward movement of the tractor. This is an advantage over prior scrapers with which it often requires more power to dump the scraper than to merely pull it forward, so that when the tractor stalls because of an overload, it is difficult to dump the scraper.

When it is desired to dump the loaded scraper and distribute the soil evenly, the scraper is tilted forward, as in Fig. 4, and the blade 40 then serves to spread and to level off the soil. As the scraper 70 is tilted forwardly, it first rotates, relative to the ground, above the forward edge of blade 40. Relative to the draft frame, the scraper pivots about pins 28. As the scraper tilts about blade 40, axles 24a are moved forwardly and downwardly so that when the position shown by the dotted lines of Fig. 4 is reached, wheels 24 are in contact with the ground. During the tilting, pins 28 have moved upward about the forward edge of blade 40, thus elevating the draft frame. After wheels 24 rest on the ground, additional tilting rotates the scraper about axles 24a and continues to lift pins 28 so that the entire weight of the leveler is now on wheels 24. This is the dumping or leveling position and the soil distribution may be regulated by the height at which blade 40 is carried. The leveler is normally carried in the dumping position with the weight on the wheels when inoperative because this permits faster and easier travel from point to point when the leveler is merely being transported.

A variational form of mounting the wheels is shown in Figs. 5 and 6, such mounting permitting the scraper to be worked against a bank or in barrow pits. The wheels 44 are mounted on axles 45a on the ends of shaft 45 bent to form a crank or lever arrangement by which the wheels may be raised or lowered. Shaft 45 is attached to the draft frame 11 by bearing brackets 46 on cross bar 15. Between brackets 46, upwardly extending lever arms 47 are fastened to shaft 45. Connecting bars 48 are pivoted to the scraper arms 36 and to upper end of the shaft arms 47. The wheels are normally held up off the ground as shown when the scraper is tilted backwardly and in operation. This permits the scraper to pick up soil in the manner described with the entire weight supported on the blade edge. As the scraper tilts forwardly, bar 48 moves in the same direction and moves shaft 45 to lower wheels 44. The lever arms are so arranged that the wheels carry the entire load by or slightly before the time the scraper reaches the extreme forward position and the leveler may then be transported with the scraper inoperative.

Figs. 7 and 8 show another manner of mounting the carrying wheels. In this form, wheels 50 are carried on the forked ends of bell crank levers 51 pivoted at 52 to the back 21 of the scraper. The upper end of each lever 51 is slotted to receive a guide pin 53 on the end of stay arm 54 rigidly fastened to cross bar 15 at bracket 56. Stays 54 being fixed in position, guide pins 53 remain stationary to govern the movement of lever 51 as the scraper is tilted.

When the scraper is operating in the position shown, the wheels 50 are off the ground and the leveler functions as described. When the scraper is tilted forwardly, it pivots about blade 40 and pins 28 and consequently pivot 52 moves clockwise in an arc about pin 28. With pin 53 remaining fixed, wheels 50 are depressed by this tilting of the scraper and automatically lift the scraper off the ground as the end of the forward tilt is reached.

In order to operate the scraper as described by means of the cylinders 30, 31, I provide suitable means for controlling the fluid flow through pipes 37, 38. A present preferred form of this means (Figs. 9 to 12) comprises a power pump generally indicated at 60 and a four-way control valve generally indicated at 61. A reservoir 62 holds a reserve supply of the fluid used, which is typically oil, and will be so termed, though any fluid may be used, liquids being preferred for reasons that will appear. The reservoir is carried on bracket 62a attached to the tractor frame member 13a.

Pump 60, of any conventional type, though preferably a gear pump, is supported on bracket 64 fastened to the tractor frame 13a and is driven by power take off shaft 65 which is the usual method of driving auxiliary devices from the tractor engine. Oil is introduced into pump 60 from reservoir 62 by pipe 66 and is forced from pump outlet 67 into passage 68 in casting 69 bolted to the pump. When the scraper is being held stationary, it is desirable to by pass the oil directly from the pump to the reservoir. The by pass leading from passage 68 consists of 69a, chamber 71 and pipe 73 leading into the bottom of the reservoir, the flow through port 69a being controlled by relief valve 70. The raising of relief valve 70 permits the oil to flow into chamber 71 and back to the reservoir through pipe 73 so that a free circulation is established when pressure is not needed. When pressure is desired to operate the scraper, valve 70 is closed, and the oil then flows through passage 68, past ball check valve 75, and through inlet 76 to valve chamber 77 of valve 61.

The valve 61 comprises a valve block 61a within which are four valves, 80, 81, 82, 83. These valves, and also valve 70, are preferably of the poppet type since an oil tight seat may easily be ground in the valve block and the simple construction makes for trouble-free operation. Access to the valves is had by removing screw plugs 85 which are bored to receive springs 86 that press against the valve heads to seat the valves. The valve stems extend through packing glands 88 which prevent oil leakage from the passage in the valve block.

Valves 81 and 82 are adapted to close the openings between valve chamber 77 and pressure outlets 107 and 108 which communicate by means of flexible tubes 109 and 110 with pipes 38 and 37, respectively. Communication between outlets 107 and 111 and outlets 108 and 112 is closed by valves 80 and 83 respectively. Outlets 111 and 112 are by-pass outlets in communication with the reservoir by means of pipes 115 and 116 respectively.

The valves are operated by cams 90, 91, 92, 93 on cam shafts 94 and 95 carried in depending plates 96 bolted to the valve block. One pair of valves, 80 and 82, is operated by cams 90 and 92 on shaft 95, and the other pair of valves, 81 and 82, is operated by cams 91 and 93 on shaft 94. The cams are so arranged that when either pair of valves 80, 82 or 81, 83 is open, the other pair is closed, though in the intermediate or neutral cam position, both pairs are closed. The closing of the valves is done by springs 86. The cam shafts are rocked by operating handle 97 on shaft 95, the short arm 98 on shaft 94 being attached to handle 97 by link 99 so that both shafts move equally and simultaneously.

Pivotally attached to operating handle 97 by bolt 97a, is equalizer bar 97b, to the outer ends of which are rigidly attached guide rods 100 carrying adjustable stops 101 and 101a. The guide rods extend slidably through the ends of rocker arm 102 carried on cam shaft 103 mounted on the forward side of the reservoir 62. Shaft 103 carries a cam 104 adapted to engage the upper end of valve 70 to depress the valve upon rotation of the shaft, as will now appear.

If handle 97 is pulled to the left as in Fig. 10, stop 101 rocks arm 102 and depresses cam 104 to close valve 70. This diverts the oil into valve chamber 77. The same movement of handle 97 rocks cam shaft 95 to depress cams 90 and 92 to permit valves 80 and 82 to close under the action of springs 86, and rocks shaft 94 to raise cams 91 and 93 and hence to open valves 81 and 83. This allows oil forced under pressure from the pump (valve 70 being closed) to flow past valve 75

8l and through outlet 107 to cylinder 31 via pipe lines 109 and 38. This will tilt the scraper forwardly. The oil returning from cylinder 30 as the piston therein exhausts the cylinder, flows through lines 37 and 110 to outlet 108, and thence past open valve 83 to outlet 112 and into the reservoir via pipe 116.

When the scraper has been tilted sufficiently, handle 97 is moved to a vertical or neutral position. This moves cam shafts 94 and 95 to intermediate positions in which all four valves may be closed so that pressure is maintained in cylinder 31 to hold the scraper in position. The oil pressure will tend to close valves 80 and 83 so that the oil cannot return to the reservoir, and any tendency to open valves 81 and 82 is nullified by the closing of check valve 75. The raising of cam 104 permits the oil to open by-pass valve 70 and to circulate between the pump and reservoir.

If handle 97 is pulled to the right, as viewed in Fig. 10, from its intermediate position, stop 101a rocks arm 102 and cam 104 to again close valve 70. Valves 81 and 83 remain closed, while valves 80 and 82, operated from shaft 95, open. The opening of valve 80 allows exhaust oil from cylinder 31 to flow back through outlets 107 and 111 to return to the reservoir via pipe 115; and the opening of valve 82 permits pressure oil from the pump, to flow via outlet 108, and lines 110 and 37 to cylinder 30 to tilt the scraper rearwardly and reversely to the first described operation. The return of handle 97 to the vertical position, permits valves 80 and 82 to close, thereby maintaining a fluid lock to hold the scraper in position. The scraper may be held in any desired position, when handle 97 is vertical, by the entrapping of the incompressible oil in the cylinders by the closing of the four valves, so as to set up, in effect, a fluid lock preventing motion of the pistons in the cylinders.

It will be noticed that handle 97 operates to close relief valve 70 against the oil pressure in chamber 68, and that when the handle is released the pressure will open valve 70 and automatically return the handle to the vertical. As the pressure builds up in chamber 68, it becomes proportionately difficult to hold the handle in position against the pressure, so that before dangerously excessive pressures are reached, the operator will release the handle. Relief valve 70 thus becomes a safety valve that automatically prevents dangerous pressures that would occur at the end of each stroke of the pistons in cylinders 30, 31 were the full pressure from pump 60 permitted to continue. As it is, the valves 80, 81, 82, 83 are closed and the safety valve opened at the proper time to relieve the pressure and prevent damage.

Under such conditions as make the use of a hand pump instead of a power pump desirable, the pump 120 illustrated in Figs. 13, 14, 15 may be used. The pump comprises a valve block 121, and piston containing cylinders 122 and 123 secured to opposite sides of the valve block. Pistons 122a and 123a are interconnected by link 125 so that the movement of the pistons is equal and simultaneous. Handle 126 is pivoted at its lower end at 126a to the tractor frame and has a pin and slot connection 126b with link 125 so that the link may be moved longitudinally and pistons 122a and 123a operated, by swinging the handle about the pivot. This tandem arrangement of two single acting pump cylinders produces, in effect, a double acting pump.

The general location of pump 120 is shown in Fig. 15. Oil circulates from reservoir 62 through pipe 127 to the pump and then through pipe 128 to control valve 61. The construction and operation of the four-way valve are the same as with the power pump, although the relief valve may be dispensed with since the pressure pump 120 is intermittent and not continuous in its use, and the function of check valve 75 is performed in this instance by check valves 138 and 139 as will be seen.

Within the valve block 121, the inlet conduit branches so that one branch leads from pipe 127 to each of the cylinders, conduit 130 leading to cylinder 122, and conduit 131 to cylinder 123. Ball check valves 133 and 134 are placed in passages 130 and 131 respectively to prevent return flow of the oil from the cylinders to the reservoir or from one cylinder to the other. Access to the check valves is had by screw plugs 140 in the valve block. The outlet conduit 128 is similarly branched to communicate with pipe 128 and with both cylinders, conduit 135 leading to cylinder 122 and conduit 136 to cylinder 123. Ball check valves 138 and 139 in conduits 135 and 136, respectively prevent return of oil to the cylinders or communication between cylinders.

As handle 126 is moved from the vertical to the left as illustrated in Fig. 13, oil is drawn into cylinder 122 via conduit 130 and expelled from cylinder 123 via conduit 136, valves 134 and 138 being closed. As the handle is moved to the right, oil is drawn into cylinder 123 via conduit 131 and expelled from cylinder 122 via conduit 135. During this time valves 134 and 138 are open and valves 133 and 139 are closed. By means of this valve and conduit arrangement oil is forced through pipe 128 at each stroke of handle 126; but when the handle is not being operated there is no oil circulation so that the by-pass circulation through the reservoir 62 provided by valve 70 is no longer required.

Having described my invention in detail, I do not wish to be limited to the exact arrangement and construction illustrated for it will be apparent to those skilled in the art that various changes in construction and combination of parts may be made without departing from the spirit and scope of the appended claims.

I claim:—

1. A land leveler comprising a draft frame, a scraper normally disengaged from the ground surface and tiltably movable into scraping engagement therewith, said scraper comprising a forwardly sloping bottom and a vertically extending back with the top of the back curved forwardly, a pair of frame members pivotally connected to said scraper, a longitudinally movable scraper operating member connected to the back of the scraper and extending forwardly of said frame, and a pair of wheels normally engaging the ground surface to support the scraper and said frame, said wheels being movable to raised positions off the ground by tilting movement of the scraper.

2. In a land leveler, a frame comprising an elongated draft member, a transverse member secured to the rear of the first mentioned member, a pair of braces attached to the ends of said transverse member and converging forwardly of the frame to points of attachment with said draft member, a transversely extending scraper at the rear of said transverse frame member, said scraper comprising an inclined bottom and a substantially vertical back, a plurality of arms projecting rearwardly of the last mentioned member and pivotally connected to the inclined bottom of said scraper, and means for pivotally moving said scraper relative to the frame.

3. In a land leveler, a frame comprising an elongated draft member, a transverse member secured to the rear of the first mentioned member, a pair of braces attached to the ends of said transverse member and converging forwardly of the frame to points of attachment with said draft member, a transversely extending scraper at the rear of said transverse frame member, a plurality of arms projecting rearwardly of the last mentioned member and pivotally connected to said scraper, a pair of wheels carried on the ends of the scraper, and a longitudinally movable scraper operating member connected to the back of the scraper and extending forwardly of said frame.

4. A land leveler comprising a draft frame, a scraper normally disengaged from the ground surface and tiltably movable into scraping engagement therewith, said scraper comprising forwardly sloping bottom and a vertically extending back, a pair of frame members pivotally connected to said scraper, a pair of cylinders mounted in tandem arrangement on said frame, a pair of fluid pressure actuated plungers in said cylinders, a link interconnecting said plungers, connecting means between said link and the scraper, and a pair of wheels normally engaging the ground surface to support the scraper and said frame, said wheels being movable to raised positions off the ground by tilting movement of the scraper.

5. In a land leveler, a draft frame, a tiltably movable scraper connected to said frame, and a scraper operating mechanism comprising a pair of cylinders mounted in tandem arrangement on said frame, a pair of fluid pressure actuated plungers in said cylinders, a link interconnecting said plungers, and connecting means between said link and the scraper.

6. A land leveler comprising a draft frame, a tiltably movable scraper connected to said frame, scraper operating means including a pair of cylinders, a pump for supplying fluid under pressure to said cylinders, and means for controlling the flow of fluid to said cylinders; said means comprising a plurality of valves, and means to operate said valves to selectively direct the fluid from the pump to one of said cylinders, and to exhaust the fluid from the other cylinder.

7. In a land leveler, a draft frame, a scraper pivotally attached to the draft frame for tilting movement into and out of ground engagement, means for tiltably operating the scraper, and a pair of wheels mounted on the scraper one at each end on axles eccentric to the pivotal connection of the scraper to the draft frame.

8. In a land leveler, a draft frame, a scraper pivotally attached to the draft frame for tilting movement into and out of ground engagement, means for tiltably operating the scraper, carrying wheels pivotally mounted on the back of the scraper on pins eccentric to the pivotal connection of the scraper to the frame, and means connected to the frame to move the wheels about said eccentric pins when the scraper tilts.

9. In a land leveler, a draft frame, a scraper pivotally attached to the draft frame for tilting movement into and out of ground engagement and thus into and out of loading position, respectively, means for tiltably operating the scraper, carrying wheels mounted on the frame to swing about a point eccentric to the wheel axles, said wheels being swingable into and out of ground engagement, and means connected to the scraper to swing the wheels about said eccentric point by virtue of tilting movement of the scraper, tilting movement of the scraper into loading position swinging the wheels out of ground engagement.

10. A land leveler comprising an adjustable scraper tiltably movable into and out of engagement with the ground, and means to tiltably operate the scraper; said scraper comprising an inclined bottom portion and an upwardly extending back curving forwardly at its top to produce a lifting force on the scraper when the fully loaded scraper is drawn forward, whereby excessive soil penetration of the scraper bottom is prevented.

11. In a tractor drawn land leveller of the character described, a draft frame pivotally connected at its forward end to the tractor, and a scraper attached to the rear end of the draft frame and adapted when loading to rest on the ground to support the draft frame; said scraper comprising a transversely extending, inclined bottom portion, forwardly extending end walls, and an upwardly extending back curving forwardly at its top to produce a lifting force on the scraper when the fully loaded scraper is drawn forward, said lifting force limiting the soil penetration of the scraper bottom.

12. In a tractor drawn land leveller of the character described, a draft frame pivotally connected at its forward end to the tractor, a scraper pivotally attached to the rear end of the draft frame for tilting movement and adapted when loading to rest on the ground to support the draft frame; said scraper comprising a transversely extending inclined bottom portion, forwardly extending end walls, and an upwardly extending back curving forwardly at its top to produce a lifting force on the scraper when the fully loaded scraper is drawn forward, said lifting force limiting the soil penetration of the scraper bottom; and means to tilt the scraper relative to the draft frame to control the size of the load and the maximum magnitude of said lifting force.

13. A land leveller of the character described comprising a draft frame, a scraper pivotally connected to the draft frame for tilting movement into and out of scraping engagement with the ground, means for tiltably operating the scraper, and a pair of wheels mounted on axles swingable about the pivot connection of the scraper and the frame as the scraper tilts, said wheels engaging the ground and supporting the scraper when the scraper is out of ground engagement and swinging out of ground engagement when the scraper is in ground engagement.

14. A land leveler of the character described comprising a draft frame, a scraper pivotally connected to the draft frame for tilting movement into and out of scraping engagement with the ground, means for tiltably operating the scraper, and a pair of wheels mounted on axles swingable about the pivot connection of the scraper and the frame as the scraper tilts, said wheels being out of ground engagement when the scraper is in scraping engagement with the ground and being swung downwardly into ground engagement to support the scraper by forward tilting of the scraper out of ground scraping position.

CHARLES H. MARTIN.